(12) United States Patent
Kondo et al.

(10) Patent No.: US 9,586,345 B2
(45) Date of Patent: Mar. 7, 2017

(54) AUTOCLAVE AND METHOD FOR HEAT CURING MOLDED MATERIAL

(75) Inventors: Yoshiyuki Kondo, Tokyo (JP); Koichi Tanimoto, Tokyo (JP); Yukio Takeuchi, Tokyo (JP); Yusuke Yanase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 691 days.

(21) Appl. No.: 13/982,864

(22) PCT Filed: Jan. 25, 2012

(86) PCT No.: PCT/JP2012/051572
§ 371 (c)(1),
(2), (4) Date: Jul. 31, 2013

(87) PCT Pub. No.: WO2012/114817
PCT Pub. Date: Aug. 30, 2012

(65) Prior Publication Data
US 2013/0313760 A1 Nov. 28, 2013

(30) Foreign Application Priority Data
Feb. 21, 2011 (JP) ................. 2011-034496

(51) Int. Cl.
*A21B 1/22* (2006.01)
*B29C 35/02* (2006.01)
(Continued)

(52) U.S. Cl.
CPC ........ *B29C 35/0227* (2013.01); *B29C 35/045* (2013.01); *F27B 17/0083* (2013.01); *F27B 2005/167* (2013.01)

(58) Field of Classification Search
CPC ............... B29C 35/0227; B29C 35/045; F27B 17/0083; F27B 2005/167
See application file for complete search history.

(56) References Cited

U.S. PATENT DOCUMENTS 3,111,397 A * 11/1963 Metz ................. B28B 3/025
264/431
4,469,721 A * 9/1984 Shioya ................. C04B 35/565
427/397.8
(Continued)

FOREIGN PATENT DOCUMENTS

| JP | 2-162019 | 6/1990 |
|---|---|---|
| JP | 4-135810 | 5/1992 |

(Continued)

OTHER PUBLICATIONS

International Search Report issued Apr. 24, 2012 in International (PCT) Application No. PCT/JP2012/051572 with English translation.
(Continued)

*Primary Examiner* — Galen Hauth
(74) *Attorney, Agent, or Firm* — Wenderoth, Lind & Ponack, L.L.P.

(57) ABSTRACT

An autoclave (1) is one in which a heat application target molded material (W) is retained in shape by a retaining jig (4) which has a cavity (15) therein, and is heat-cured with high temperature gas. The autoclave is provided with: a pressure vessel (2) in the interior of which the molded material (W) is arranged; a high temperature gas supplying device (5) which supplies the high temperature gas to the molded material (W) within the pressure vessel (2); and an auxiliary high temperature gas supplying device (7) which supplies the high temperature gas into the interior of the cavity (15).

7 Claims, 7 Drawing Sheets

(51) Int. Cl.
  *B29C 35/04*  (2006.01)
  *F27B 17/00*  (2006.01)
  *F27B 5/16*  (2006.01)

(56) References Cited

U.S. PATENT DOCUMENTS

2007/0089868 A1* 4/2007 Houfuku .................. F28F 1/40
                 165/133
2009/0242184 A1* 10/2009 Mishima ............... F28D 7/1607
                 165/181

FOREIGN PATENT DOCUMENTS

| JP | 10-632 | 1/1998 |
| JP | 2733869 | 3/1998 |
| JP | 2799633 | 9/1998 |
| JP | 2005-178077 | 7/2005 |
| JP | 4109660 | 7/2008 |
| JP | 2009-51074 | 3/2009 |
| JP | 4326335 | 9/2009 |
| JP | 2010-530823 | 9/2010 |
| JP | 2011-12945 | 1/2011 |

OTHER PUBLICATIONS

Written Opinion of the International Searching Authority issued Apr. 24, 2012 in International (PCT) Application No. PCT/JP2012/051572 with English translation.

* cited by examiner

AUTOCLAVE AND METHOD FOR HEAT CURING MOLDED MATERIAL

TECHNICAL FIELD

The present invention relates to an autoclave for heat curing molding under pressure, a fiber reinforced plastic (FRP) molded material that serves as a component of an aircraft, an industrial machine, or the like, and to a molded material heat curing method that uses this autoclave.

Priority is claimed on Japanese Patent Application No. 2011-034496, filed Feb. 21, 2011, the contents of which are incorporated herein by reference.

BACKGROUND ART

Heretofore, as a method for molding a molded material composed of a fiber reinforced plastic (FRP), there is known an autoclave molding method in which a number of laminated thin plate-shaped fiber reinforced plastics are heated under high pressure (for example, refer to Patent Document 1). This autoclave molding method is performed with an autoclave, in the interior of which high pressure and high temperature gas circulates.

In this autoclave, in a state where a molded material is arranged within a pressure vessel in which a high pressure and high temperature gas has been supplied from the outside, the high pressure and high temperature gas within the pressure vessel is heated and circulated. As a result, thin plate-shaped fiber reinforced plastics, which are laminated in a number of layers, are heat-cured and bonded, and a composite material can be obtained as a result.

As another method for heat molding a molded material, there is known a method in which molding is performed within a curing furnace with no pressurizing operation, and a method in which only a jig is heated to cure a molded material.

PRIOR ART DOCUMENT

Patent Document

[Patent Document 1] Japanese Patent No. 4109660

DISCLOSURE OF INVENTION

Problems to be Solved by the Invention

In the above autoclave, when heat curing molding a large vent type stringer member to be used for a main wing of an aircraft for example, use of a retaining jig for retaining the shape of the molded material is essential. Consequently, the ambient temperature within the pressure vessel is unlikely to be transmitted directly to the molded material, and the efficiency of heat application to the molded material is deteriorated, resulting in a long curing time.

Furthermore, since the molded material is of a large size and is also of a specialized shape, unevenness occurs in heat application, and there is concern of defective products that may occur due to uneven heat curing or internal heat generation of the molded material.

The present invention takes into consideration the above circumstances, with an object of providing an autoclave and a method for heat curing a molded material, capable of shortening the heat curing molding time of a molded material, and suppressing the occurrence of defective products.

Means for Solving the Problem

The present invention employs the following measures in order to solve the above problem.

That is to say, the autoclave according to the present invention is an autoclave for heat curing with high temperature gas a heat application target molded material, the autoclave comprising: a pressure vessel of which the molded material is arranged in the interior; a retaining jig which retains the shape of the molded material, and the interior of which is formed with a cavity; a high temperature gas supplying device which supplies the high temperature gas to the molded material within the pressure vessel; and an auxiliary high temperature gas supplying device which supplies the high temperature gas into the cavity of the retaining jig.

According to the autoclave equipped with this type of retaining jig, due to the auxiliary high temperature gas supplying device which supplies high temperature gas into the cavity of the retaining jig, it is possible to transmit the ambient temperature of the pressure vessel interior directly to the contact portion between the molded material and the retaining jig, to which, heretofore, the ambient temperature of the pressure vessel interior was unlikely to be transmitted directly. Therefore it is possible to increase the speed of temperature increase of the molded material. As a result, for example, in a large vent type stringer member, which conventionally requires a long heat curing time, it is possible to reduce the amount of time required for heat curing molding. Furthermore, even heat application to a molded material, which has been conventionally difficult now becomes possible, and the occurrence of defective products can be suppressed.

Moreover, even in a case where, for example, heat has been generated excessively in a part of the contact portion between the molded material and the retaining jig, it is possible, with high temperature gas supplied to the cavity of the retaining jig, to remove heat of this heat-generated part. That is to say, it is possible, with the high temperature gas supplied by the auxiliary high temperature gas supplying device, to obtain an effect of releasing heat of the above heat-generated part, and therefore the occurrence of defective products caused by this heat generation can be suppressed.

Furthermore, in the auxiliary high temperature gas supplying device according to the present invention that supplies high temperature gas into the retaining jig cavity, it is preferable that there is provided a guide pipe that takes in a part of the high temperature gas that is supplied into the pressure vessel of the autoclave by the high temperature gas supplying device, and that guides it into the retaining jig cavity.

According to the autoclave comprising a retaining jig having this type of guide pipe, it is possible to supply the high temperature gas within the pressure vessel more efficiently into the retaining jig cavity. As a result it is possible to further shorten the heat curing molding time for a molded material, and suppress the occurrence of defective products caused by uneven heat application or heat generation within the molded material.

Moreover, in the autoclave according to the present invention, the guide pipe may be provided at both ends of the cavity of the retaining jig, and there may be provided a flow outlet which communicates between the inside and the outside of the cavity, and through which the high temperature gas supplied into the cavity by the guide pipe flows out.

According to the autoclave having this type of guide pipe that is provided at both ends of the retaining jig, more high temperature gas flows into the retaining jig so that heat transmission between the retaining jig inner surface and the molded material is further improved. As a result, it is possible to further shorten the heat curing molding time, and suppress the occurrence of defective products caused by uneven heat application or heat generation within the molded material.

Furthermore, it is preferable that the autoclave according to the present invention is provided with a first fin arranged on an inner surface that forms the cavity of the retaining jig.

Due to this first fin, the total heat transfer area of the inner surface that forms the cavity of the retaining jig is increased, and heat transmission between the high temperature gas that has flowed into the retaining jig cavity, and the molded material can be improved. As a result, it is possible to further shorten the heat curing molding time, and suppress the occurrence of defective products caused by uneven heat application or heat generation within the molded material.

Moreover, the autoclave according to the present invention is preferably such that the first fin is arranged in a spiral shape.

Due to this type of spiral-shaped fin, high temperature gas supplied into the retaining jig cavity by the auxiliary high temperature gas supplying device becomes a swirling flow so that it is possible to further improve heat transmission between the high temperature gas and the molded material. As a result, it is possible to further shorten the heat curing molding time, and suppress the occurrence of defective products caused by uneven heat application or heat generation within the molded material.

Furthermore, it is preferable that the autoclave according to the present invention is provided with a second fin arranged on an outer surface of the retaining jig.

Due to this type of second fin provided on the outer surface of the retaining jig, the total heat transfer area of the retaining jig outer surface is increased so that heat transmission between the high temperature gas within the pressure vessel, and the molded material can be improved. As a result, it is possible to further shorten the heat curing molding time, and suppress the occurrence of defective products caused by uneven heat application or heat generation within the molded material.

Moreover, it is preferable that the autoclave according to the present invention is provided with a flow guide which guides the high temperature gas within the pressure vessel that is supplied by the high temperature gas supplying device, so that it flows along an outer surface of the retaining jig.

Due to this type of flow guide, the high temperature gas is guided to flow along the retaining jig to improve heat transmission between the high temperature gas within the pressure vessel and the molded material, so that the ambient temperature within the pressure vessel is more likely to be transmitted to the molded material. As a result, it is possible to further shorten the heat curing molding time, and suppress the occurrence of defective products caused by uneven heat application or heat generation within the molded material.

Furthermore, in the autoclave according to the present invention, it is preferable that a black body coating material is applied to a surface of the retaining jig.

By applying this type of black body coating material (for example, normal white or black paint), radiant heat transmission between the high temperature gas within the pressure vessel and the retaining jig is promoted, and a further shortening of the heat curing molding time for a molded material can be achieved.

The method for heat curing a molded material according to the present invention is a method for heat curing a molded material in which a heat application target molded material is heat-cured with high temperature gas. The method comprises: retaining the shape of the molded material with a retaining jig, an interior of which is formed with a cavity; supplying the high temperature gas to the molded material arranged within a pressure vessel, using a high temperature gas supplying device; and supplying the high temperature gas into the cavity of the retaining jig, using an auxiliary high temperature gas supplying device.

As a result, as with the above, it is possible to shorten the heat curing molding time for a molded material, and suppress the occurrence of defective products caused by uneven heat application or heat generation within the molded material.

Effect of the Invention

According to the autoclave and the method for heat curing a molded material of the present invention, by providing the auxiliary high temperature gas supplying device within the retaining jig cavity, it is possible to achieve increased heat transmission and even heat application to a large vent type molded material that is a heat application target. As a result, it is possible to shorten the heat curing molding time for a molded material. Moreover the occurrence of defective products caused by uneven heat application or heat generation within the molded material can be suppressed, and an increase in manufacturing cost can also be suppressed.

BEST MODE FOR CARRYING OUT THE INVENTION

Hereunder, an autoclave 1 of a first embodiment of the present invention is described, with reference to FIG. 1 through FIG. 4.

The autoclave 1 is used when heat-curing molding under pressure, a molded material W that is composed of laminated sheets of a composite material such as fiber reinforced plastic (FRP), in which carbon fibers are impregnated with a resin material for example. This autoclave 1 comprises; a pressure vessel 2, an inner vessel 3, a retaining jig 4, a high temperature gas supplying device 5, an auxiliary high temperature gas supplying device 7, and a circulating device 6.

Figure 1:
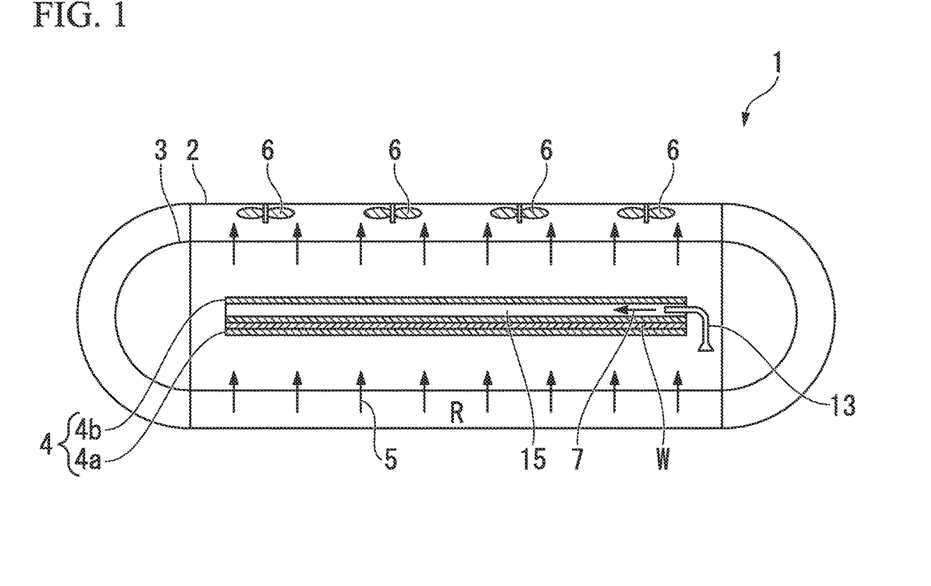
FIG. 1 is a longitudinal sectional view seen from a side of an autoclave according to a first embodiment of the present invention.
Figure 2:
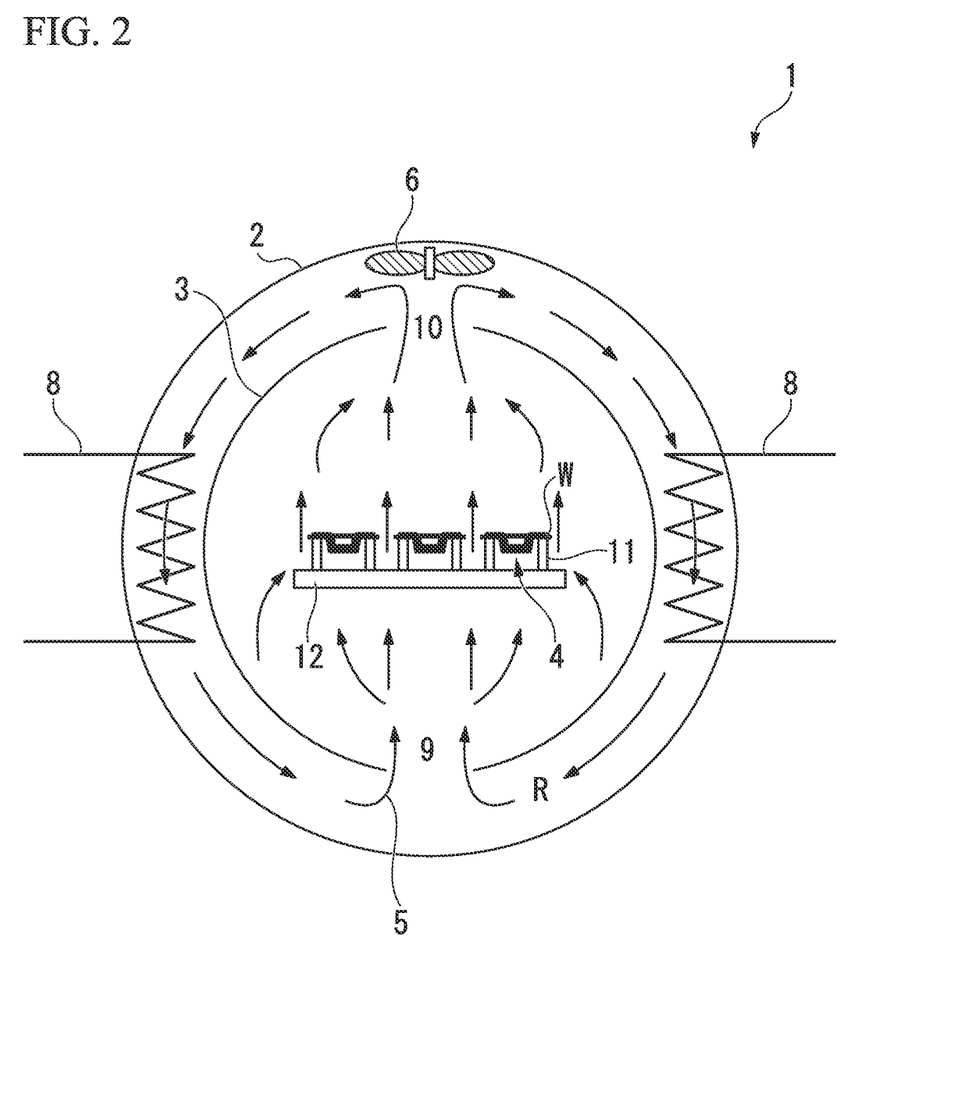
FIG. 2 is a longitudinal sectional view seen from the front of the autoclave according to the first embodiment of the present invention.

The pressure vessel 2 is of a structure in which both ends of a cylindrical shape that extends in the horizontal direction are sealed, and in the interior thereof, there is hermetically sealed a high pressure gas which is introduced by a gas introducing device (not shown in the figure).

The inner vessel 3 is a container that is arranged on the inner side of the pressure vessel 2, spaced apart from the inner wall surface of this pressure vessel 2. As with the pressure vessel 2, it is of a structure in which both ends of a cylindrical shape that extends in the horizontal direction are sealed. In the present embodiment, the pressure vessel 2 and the inner vessel 3 are arranged concentrically about a common centerline, and at least either one of two ends in the extending direction of the pressure vessel 2 and the inner vessel 3, is of an openable door-shaped structure. By opening this door, it is possible to introduce the retaining jig 4 and a molded material W into the inner vessel 3.

Moreover, a space between the pressure vessel 2 and the inner vessel 3 serves as a gas flow path R through which high pressure gas that has been introduced into the pressure vessel 2 and heated circulates. This gas flow path R is formed so as to surround the entire outer circumferential surface of the inner vessel 3.

Hereunder, the extending direction of the pressure vessel 2 and the inner vessel 3 (the left-right direction in FIG. 1, and the paper depth direction in FIG. 2) is referred to as the depth direction, and the horizontal direction of the sectional surface orthogonal to this depth direction (the paper depth direction in FIG. 1, and the left-right direction in FIG. 2) is referred to as the width direction.

The retaining jig 4 is arranged within the inner vessel 3, and has the role of retaining the molded material W.

Figure 3:
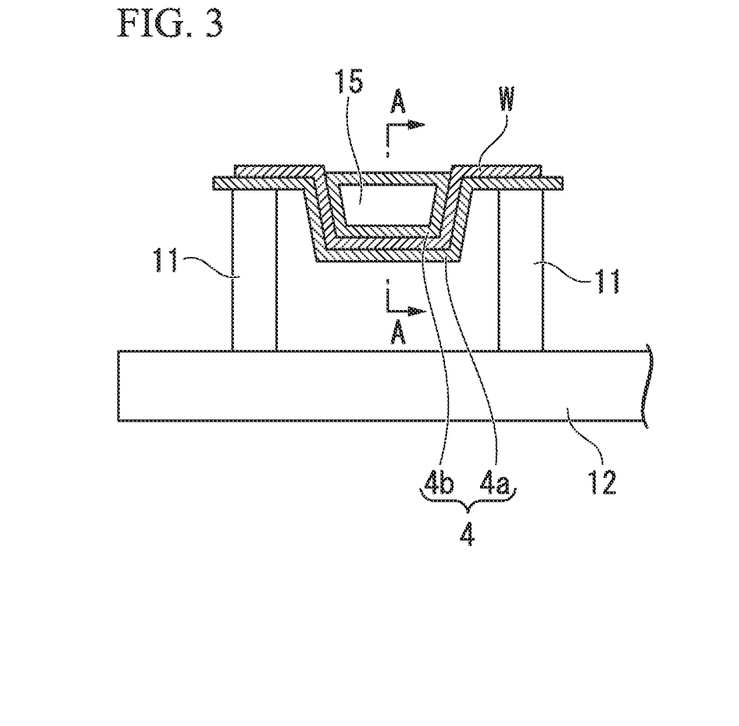
FIG. 3 is a longitudinal sectional view seen from the front, showing an enlarged view of a molded material and a molded material retaining jig in the interior of the autoclave according to the first embodiment of the present invention.

Here, the molded material W retained by the retaining jig 4 is of a large specialized shape such that of a vent type stringer used for a main wing of an aircraft for example. Specifically, as shown in FIG. 2 and FIG. 3, the molded material W is of a plate shape with its depth direction taken as the lengthwise direction thereof and its width direction taken as the widthwise direction thereof, and the widthwise center thereof is bent downward. Accordingly, the widthwise center of the lower surface of the molded material W is of a shape protruding downward in a convex shape, and the widthwise center of the upper surface of this molded material W is of a shape receding downward in a concave shape.

The retaining jig 4 is composed of two members, namely an upper member and a lower member, in order to retain the molded material W of the vent type stringer, which is the molding target in the present embodiment. That is to say, this retaining jig 4 is composed of a lower retaining jig 4a which is arranged on the lower side of the molded material W, and an upper retaining jig 4b which is arranged on the upper side of the molded material W.

The lower retaining jig 4a is to retain the molded material W from the lower side as shown in FIG. 3, and it is of a vent type similar to that of the molded material W so that it can be brought into close contact with the entire lower surface of the molded material W. Further, both of the widthwise ends thereof are supported by supporting columns 11 provided standing on a base plate 12 within the inner vessel 3.

Moreover, the upper retaining jig 4b is to retain the molded material W by sandwiching it from the upper side as shown in FIG. 3. In the interior thereof there is provided a cavity 15 which extends in the depth direction, with both ends open. In the present embodiment, in the concave part in the center of the upper surface of the molded material W, there is arranged the upper retaining jig 4b so as to be fitted therein.

The high temperature gas supplying device 5 is arranged on both sides in the width direction of the inner vessel 3 as shown in FIG. 2, and is formed with: a heater 8 for heating the gas circulating through the gas flow path R; a gas flow inlet 9 which is formed at the lower part of the inner vessel 3 and which communicates between the inside and the outside of the inner vessel 3; and a gas flow outlet 10 which is formed at the upper part of the inner vessel 3 and which communicates between the inside and the outside of the inner vessel 3.

The circulating device 6 is a fan provided at the uppermost part of the gas flow path R on the outside of the gas flow outlet 10 of the inner vessel 3. It has the role of circulating gas downward along the gas flow path R from the uppermost part of the gas flow path R. As shown in FIG. 1, this circulating device 6 is installed at several positions spaced apart in the depth direction (four positions in the present embodiment).

The auxiliary high temperature gas supplying device 7 is for supplying the high temperature gas that has been supplied into the inner vessel 3 through the gas flow inlet 9 by the high temperature gas supplying device 5, into the cavity 15 of the upper retaining jig 4b.

Figure 4:
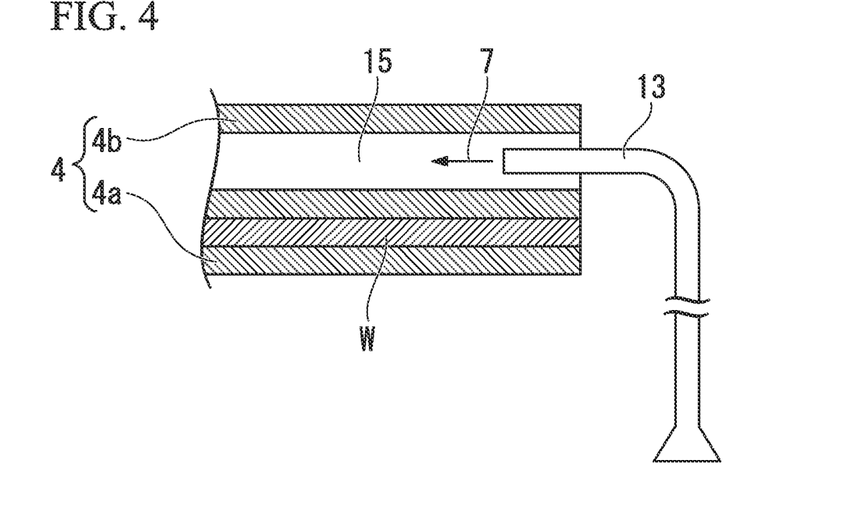
FIG. 4 shows an A-A sectional view of FIG. 3, being a longitudinal sectional view seen from a side, showing an enlarged view of the molded material and the molded material retaining jig in the interior of the autoclave according to the first embodiment of the present invention.

In the present embodiment, as the auxiliary high temperature gas supplying device 7, as shown in FIG. 1 and FIG. 4, there is employed a guide pipe 13 which introduces part of the high temperature gas that has been supplied into the inner vessel 3 into the interior of the cavity 15 of the upper retaining jig 4b. This guide pipe 13 is, for example, a pipe-shaped member that is supported within the inner vessel 3 by a supporting structure (not shown in the figure). It is arranged so that one end side opening is inserted into the cavity 15 of the upper retaining jig 4b, and the other end side opening faces downward within the inner vessel 3. Moreover, the other end side of the guide pipe 13 is formed in a bell-bottom shape which increases in diameter as the inner circumferential surface and the outer circumferential surface approach the end part.

Next is a description of the operation of the autoclave 1 of the above configuration.

When performing autoclave molding on a molded material W using this autoclave 1, in a state where the molded material W is mounted on the lower retaining jig 4a, the upper retaining jig 4b is arranged so as to sandwich the molded material W from the upper side thereof. At the same time, the high temperature gas supplying device 5 causes high temperature gas to flow into the inner vessel 3 from the gas flow inlet 9, and heat the molded material W from the periphery thereof.

Moreover, the auxiliary high temperature gas supplying device 7 sends part of the high temperature gas that has flowed into the inner vessel 3, into the interior of the cavity 15 of the upper retaining jig 4b, and heats the molded material W from the inner surface of the upper retaining jig 4b.

In this type of autoclave 1, by providing the auxiliary high temperature gas supplying device 7, high temperature gas within the inner vessel 3 can be sent directly into the interior of the cavity 15 of the upper retaining jig 4b. Therefore, heat transmission efficiency is improved, that is to say, there is a shortening of the heat curing molding time for the molded material W. Also, the amount of heat to be supplied to the molded material W can be made even. That is to say, the occurrence of defective products caused by uneven heat application or heat generation within the molded material W can be suppressed.

In particular, in the present embodiment the guide pipe 13 is provided as an auxiliary high temperature gas supplying device 7. Therefore the high temperature gas within the inner vessel 3 can be easily taken into the interior of the cavity 15 of the upper retaining jig 4b. That is to say, this guide pipe 13 enables smooth feeding of high temperature gas into the interior of the cavity 15 of the upper retaining jig 4b. Therefore heat transmission can be further improved and the supplied heat amount can be made even, so that it is possible to realize a shortening of the heat curing molding time, and a suppression of the occurrence of defective products.

The one end side opening of the guide pipe 13 need not always be inserted into the cavity 15. The one end side opening may be arranged so as to face the inside of the cavity 15 from the outside of the cavity 15.

Moreover, the other end side opening of the guide pipe 13 may be arranged so as to not only face downward within the inner vessel 3 but to also face diagonally downward or in the horizontal direction.

The guide pipe 13 of the present embodiment is such that the other end side opening is of a bell-bottom shape. However, it may be of a pipe shape with the inner diameter and the outer diameter uniform over the entire length in the extending direction thereof. A funnel-shaped device may be attached to the other end side of this type of guide pipe 13. As a result, more high temperature gas can be collected and supplied into the interior of the cavity 15 of the upper retaining jig 4b. Therefore, it is possible to promote heat transmission within the cavity 15 of the upper retaining jig 4b.

Moreover, as the auxiliary high temperature gas supplying device 7, there may be further provided a fan which facilitates the inflow of high temperature gas into the guide pipe 13.

Figure 5:
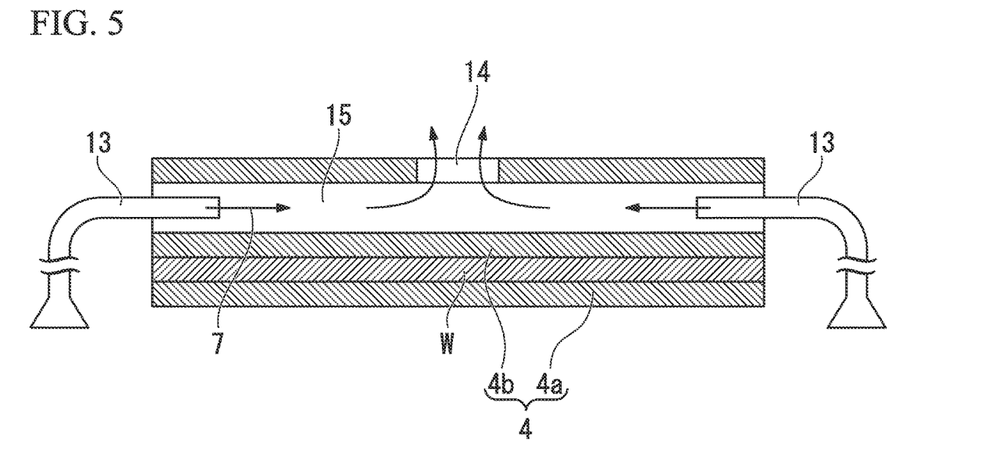
FIG. 5 is a longitudinal sectional view seen from a side, showing an enlarged view of a molded material and a molded material retaining jig in the interior of an autoclave according to a second embodiment of the present invention.

Next is a description of an autoclave 1 of a second embodiment, with reference to FIG. 5.

In the second embodiment, components similar to those of the first embodiment are denoted by the same reference symbols, and detailed description thereof is omitted.

That is to say, in the second embodiment, as the auxiliary high temperature gas supplying device 7, a guide pipe 13 similar to that of the first embodiment is provided at both ends of the upper retaining jig 4b as shown in FIG. 5. Furthermore, at the intermediate part in the depth direction of the upper retaining jig 4b, there is provided a flow outlet 14 which communicates between the inside and the outside of the cavity 15.

In this type of autoclave 1, high temperature gas within the inner vessel 3 travels through the guide pipes 13 provided at both ends of the upper retaining jig 4b, and flows into the interior of the cavity 15, and then flows out from the flow outlet 14 at the intermediate part. As a result, more high temperature gas flows into the interior of the cavity 15, so that it is possible to promote heat transmission between the inner surface of the upper retaining jig 4b and the molded material W more efficiently.

Consequently, by providing the guided pipes 13 at both ends of the upper retaining jig 4b, and the flow outlet 14 at the intermediate part, it is possible to promote heat transmission between the inner surface of the upper retaining jig 4b and the molded material W, and achieve a shortening of the heat curing molding time for the molded material W. Also, the amount of heat to be supplied to the molded material W can be made even. That is to say, the occurrence of defective products caused by uneven heat application or by heat generation within the molded material W can be suppressed.

The flow outlet 14 can be provided at several positions. Moreover, the flow outlet 14 may be provided not only at the intermediate part in the depth direction of the cavity 15 but also at another position.

Figure 6:
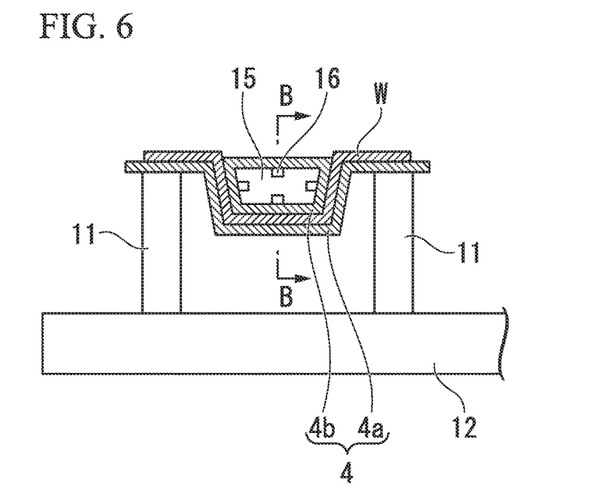
FIG. 6 is a longitudinal sectional view seen from the front, showing an enlarged view of a molded material and a molded material retaining jig in the interior of an autoclave according to a third embodiment of the present invention.
Figure 7:
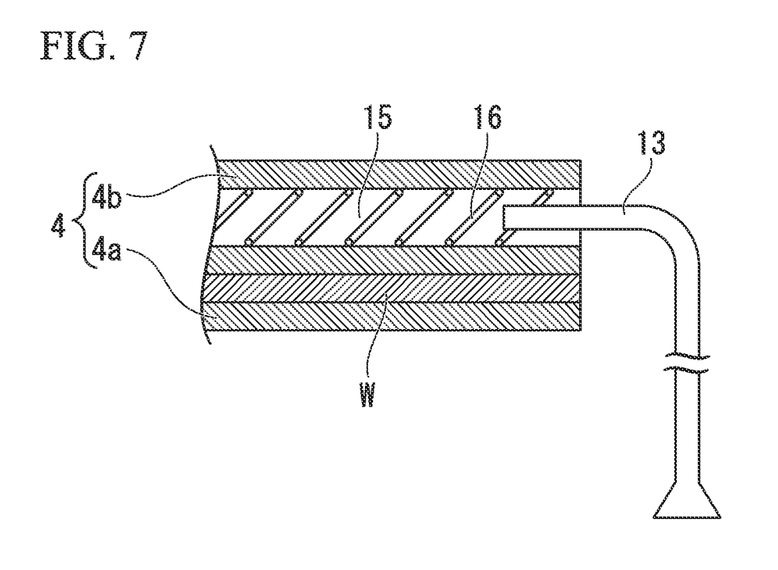
FIG. 7 shows a B-B sectional view of FIG. 6, being a longitudinal sectional view seen from a side, showing an enlarged view of the molded material and the molded material retaining jig in the interior of the autoclave according to the third embodiment of the present invention.

Next is a description of an autoclave 1 of a third embodiment, with reference to FIG. 6 and FIG. 7.

In the third embodiment, components similar to those of the first embodiment are denoted by the same reference symbols, and detailed description thereof is omitted.

In the autoclave 1 of the third embodiment, as shown in FIG. 6, first fins 16 which increase the total heat transfer area within the upper retaining jig 4b are provided.

The first fins 16 project from the inner circumferential surface of the cavity 15 and extend in the depth direction, and are provided at several positions on the inner circumferential surface spaced apart in the circumferential direction. In the present embodiment, on the inner circumferential surface of the cavity 15 there are provided a pair of fins so as to oppose to each other in the width direction, and a pair of fins so as to oppose to each other in the vertical direction.

In the present embodiment, it is possible to further improve heat transmission between the high temperature gas that has been supplied into the interior of the cavity 15 of the upper retaining jig 4b by using the auxiliary high temperature gas supplying device 7, and the upper retaining jig 4b, and the molded material W. Therefore, a further shortening of the heat curing molding time for the molded material W can be achieved. Also, the amount of heat to be supplied to the molded material W can be made even, that is to say, it is possible to suppress the occurrence of defective products caused by uneven heat application or heat generation within the molded material W.

The first fin may be formed, for example, in a spiral shape as shown in FIG. 7 such that it projects from the inner circumferential surface of the cavity 15, and is gradually twisted in the circumferential direction of the inner circumferential surface, with approach from one end side to the other end side of the cavity 15. As a result, a swirling flow of the high temperature gas introduced into the cavity 15 is generated. Therefore it is possible to further improve heat transmission and obtain an effect of making uniform the heat amount supplied to the molded material W.

Figure 8:
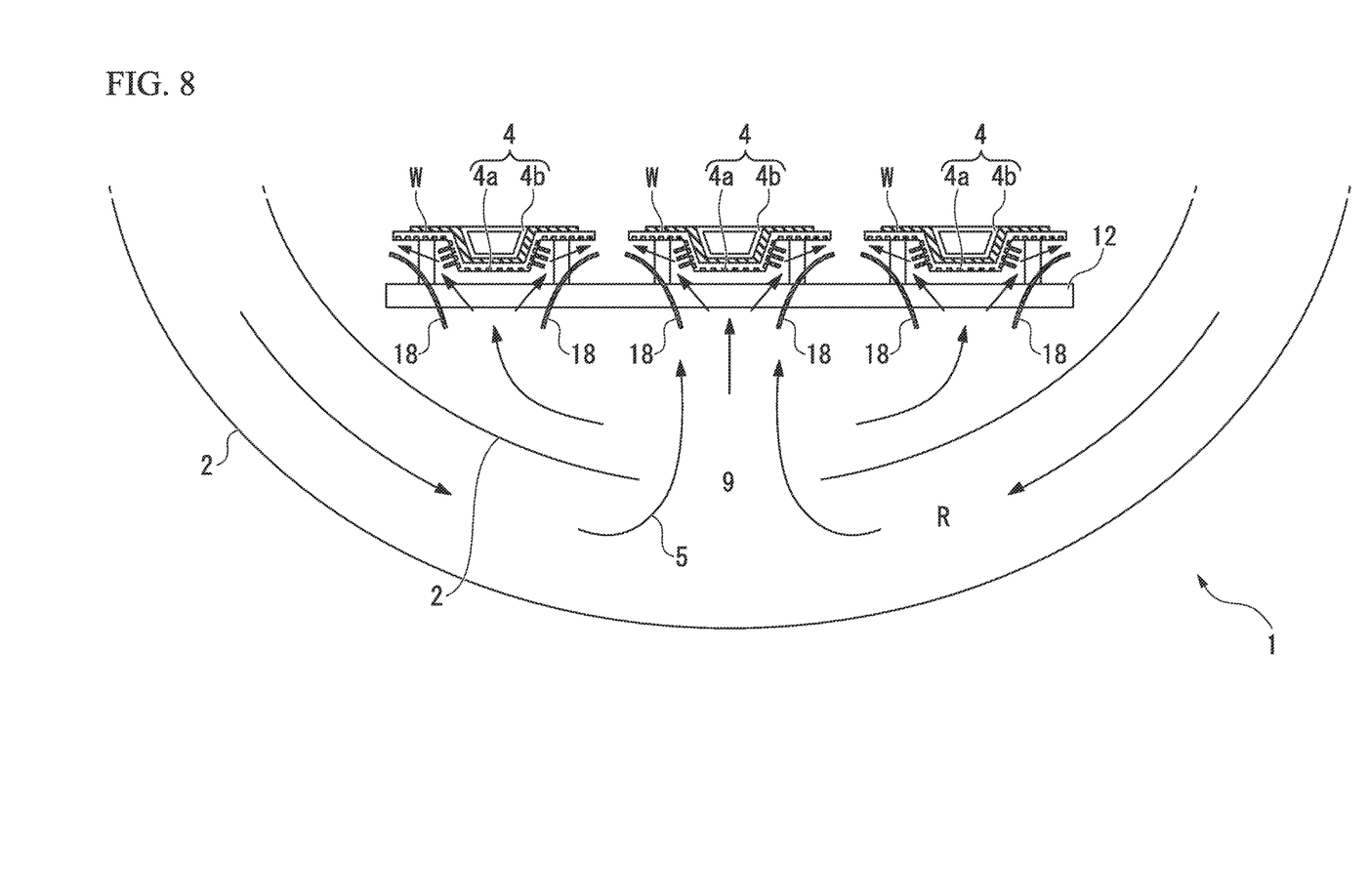
FIG. 8 is a longitudinal sectional view seen from the front of an autoclave according to a fourth embodiment of the present invention.
Figure 9:
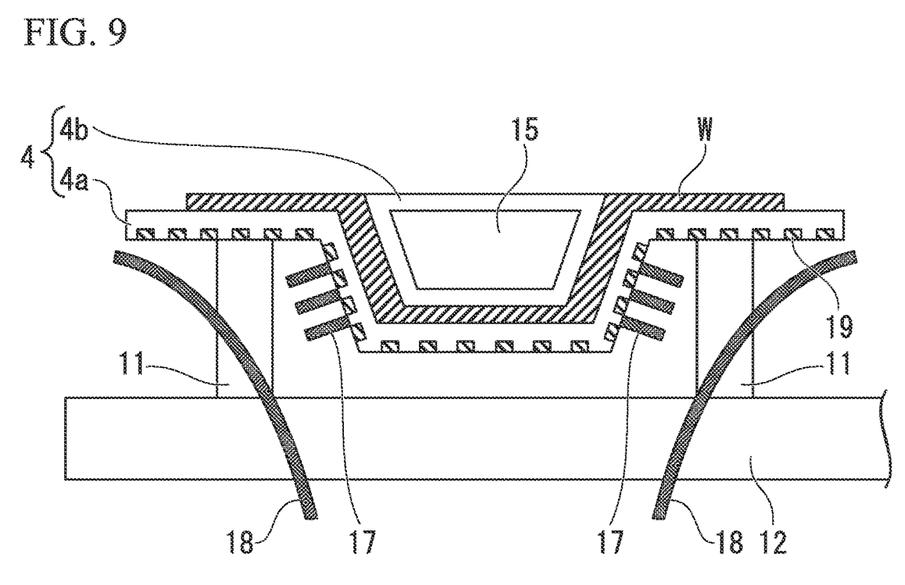
FIG. 9 is a longitudinal sectional view seen from the front, showing an enlarged view of a molded material and a molded material retaining jig in the interior of the autoclave according to the fourth embodiment of the present invention.

Next is a description of an autoclave 1 of a fourth embodiment, with reference to FIG. 8 and FIG. 9.

In the fourth embodiment, components similar to those of the first embodiment are denoted by the same reference symbols, and detailed description thereof is omitted.

As shown in FIG. 8 and FIG. 9, on the lower surface of the lower retaining jig 4a of the present embodiment, there is provided a plurality of second fins 17 each projecting from this lower surface and extending in the depth direction. In the present embodiment, on each surface facing the widthwise outer side, on the convex-shaped surface of the lower surface of the lower retaining jig 4a that is formed in a downward facing convex shape, there are provided, spaced apart in the vertical direction, a plurality of (respectively three in the present embodiment) second fins.

Due to the presence of the second fins 17 provided on the lower retaining jig 4a, the total heat transfer area is increased, so that heat transmission to the lower retaining jig 4a from the high temperature gas that has been flowed into the inner vessel 3 through the gas flow inlet 9 by the high temperature gas supplying device 5, increases. As a result, it is possible to further shorten the heat curing molding time for the molded material W. Also, the amount of heat to be supplied to the molded material W can be made even. That is to say, it is also possible to suppress the occurrence of defective products caused by uneven heat application or heat generation within the molded material W.

The second fins 17 may be provided along the direction of the high temperature gas flow. As a result, the second fins 17 do not obstruct the flow of the high temperature gas. Therefore resistance to airflow is reduced and heat transmission can be further improved. The installation position, the dimensions, the pitch, the material, and the fin thickness of this second fin 17, may be appropriately changed.

Moreover, in the autoclave 1 of the present embodiment, within the inner vessel 3 at the periphery of the lower retaining jig 4a, there are provided flow guides 18.

The flow guides 18 guide the high temperature gas that has been taken into the inner vessel 3 by the high temperature gas supplying device 5, so that it flows along the second fins 17 provided on the lower retaining jig 4a, and act so as to increase the heat transmission effect at the lower retaining jig 4a. A pair of these flow guides 18 are provided so as to correspond to each retaining jig 4. Each flow guide 18 is of a plate shape extending in the depth direction, and is formed in a shape bent widthwise outward with approach from the lower side to the upper side of the retaining jig 4.

By effectively flowing the high temperature gas by means of this flow guide 18, heat transmission is improved, giving a further shortening of the heat curing molding time for the molded material W. Furthermore, the amount of heat to be supplied to the molded material W can be made even, and suppression of the occurrence of defective products caused by uneven heat application or heat generation within the molded material W can be achieved.

The flow guide 18 may be installed not only at the periphery of the lower retaining jig 4a as shown in FIG. 8 and FIG. 9, but also at the periphery of the upper retaining jig 4b. That is to say, various installation locations that enable improvement of heat transmission from the high temperature gas within the inner vessel 3 may be selected.

Furthermore, in the autoclave 1 of the present embodiment, as shown in FIG. 8 and FIG. 9, a black body coating material 19 is applied to the lower surface of the lower retaining jig 4a.

Due to the application of the black body coating material 19, the rate of heat radiation from the surface of the lower retaining jig 4a is increased, so that heat transmission due to radiant heat transmission is improved.

It is sufficient that this black body coating material 19 is of a thermal black body, and it need not always be a black color coating material. A generic white color paint material also provides the effect. Moreover, this black body coating material 19 may be applied not only to the lower surface of the lower retaining jig 4a but also to the entire surface of the lower retaining jig 4a or to the upper retaining jig 4b. In this case, heat transmission is expected to improve further.

The improved radiant heat transmission due to the application of the black body coating material 19 enables a further shortening of the heat curing molding time for the molded material W.

The above is a description of various embodiments of the present invention. However the invention is not limited to these embodiments, and further modifications may be made in design without departing from the technical idea and scope of the invention.

For example, in the embodiments of the present invention, the lower retaining jig 4a is arranged on the lower side, and the upper retaining jig 4b is arranged on the upper side to perform heat curing molding of a molded material W. However, molding can still be performed even if the direction of retaining the molded material W changes. That is, even if heat curing molding is performed with the upper retaining jig 4b arranged on the right side with respect to the horizontal direction, and the lower retaining jig 4a arranged on the left side with respect to the horizontal direction, to retain the molded material W.

Furthermore, if the object is to mold the large vent type stringer molded material in the embodiment of the present invention, it is sufficient that the upper retaining jig 4b is capable of retaining the shape of the molded material W, and has an internal cavity 15 for flowing a high temperature gas thereinto and therefrom. Moreover, it is sufficient that the lower retaining jig 4a is capable of retaining the shape of the molded material W.

DESCRIPTION OF REFERENCE SYMBOLS

1 Autoclave
2 Pressure vessel
3 Inner vessel
4 Retaining jig
4a Lower retaining jig
4b Upper retaining jig
5 High temperature gas supplying device
6 Circulating device
7 Auxiliary high temperature gas supplying device
8 Heater
9 Gas flow inlet
10 Gas flow outlet
11 Supporting column
12 Base plate
13 Guide pipe
14 Flow outlet
15 Cavity
16 First fin
17 Second fin
18 Flow guide
19 Black body coating material
W Molded material
R Gas flow path

The invention claimed is:
1. An autoclave for heat curing with high temperature gas a heat application target molded material, the autoclave comprising:
a pressure vessel in which high temperature gas is sealed;

an inner vessel in which molded material is arranged in an interior of the inner vessel, the inner vessel being arranged on an inner side of the pressure vessel and spaced apart from an inner wall surface of the pressure vessel;

a retaining jig which retains the shape of the molded material, the retaining jig comprising:
  a lower member arranged on a lower side of the molded material; and
  an upper member arranged on an upper side of the molded material, an interior of the upper member being formed with a cavity;

a high temperature gas supplying device which supplies high temperature gas to the molded material within the inner vessel, the high temperature gas supplying device including:
  a gas flow inlet which is formed at a lower part of the inner vessel and which communications between the inside and the outside of the inner vessel; and
  a gas flow outlet which is formed at an upper part of the inner vessel and which communicates between the inside and the outside of the inner vessel; and an auxiliary high temperature gas supplying device which supplies the high temperature gas into the cavity of the retaining jig, wherein the auxiliary high temperature gas supplying device includes a guide pipe which takes in part of the high temperature gas supplied into the inner vessel by the high temperature gas supplying device and guides the high temperature gas into the cavity of the upper member, and wherein a first end of the guide pipe has a first opening and is configured to be inserted into the cavity and a second end of the guide pipe has a second opening and is configured to be faced downward within the inner vessel.

2. The autoclave according to claim 1, wherein:
the guide pipe is provided at both ends of the cavity of the upper member; and
a flow outlet is provided to the upper member, the flow outlet communicating between the inside and the outside of the cavity so that the high temperature gas supplied into the cavity by the guide pipe flows out through the flow outlet.

3. The autoclave according to claim 1, further comprising:
a first fin arranged on an inner surface that forms the cavity of the upper member.

4. The autoclave according to claim 3, wherein the first fin is arranged in a spiral shape.

5. The autoclave according to claim 3, further comprising:
a second fin arranged on a lower surface of the lower member.

6. The autoclave according to claim 1, further comprising:
a flow guide which guides the high temperature gas within the inner vessel that is supplied by the high temperature gas supplying device, so that the high temperature gas flows along a lower surface of the lower member.

7. The autoclave according to claim 1, wherein a black body coating material is applied to a surface of the retaining jig.

* * * * *